M. G. C. DODWELL.
RESILIENT TIRE.
APPLICATION FILED JAN. 25, 1910.
972,756.
Patented Oct. 11, 1910.
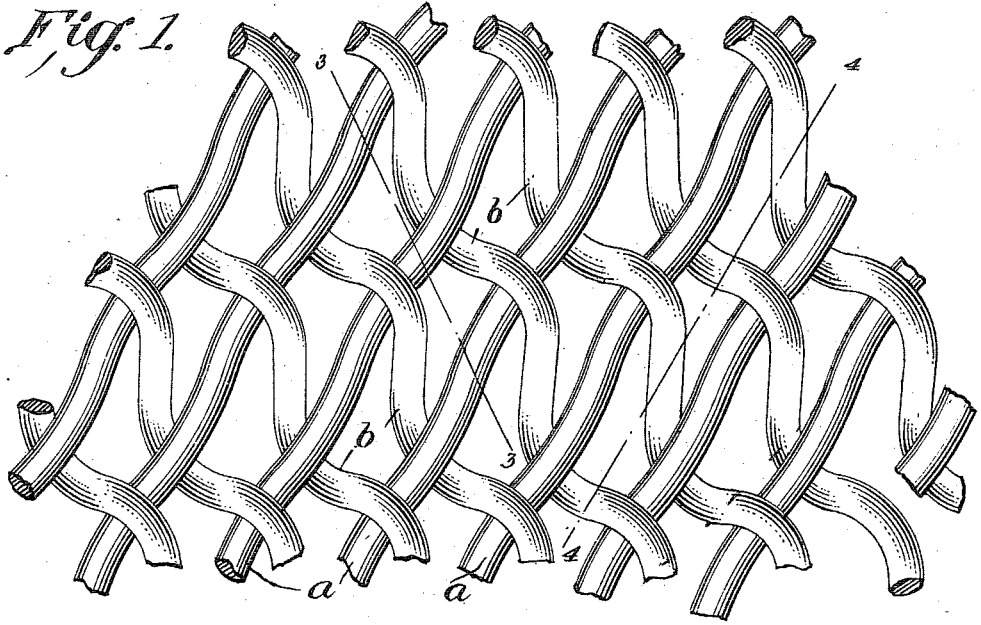
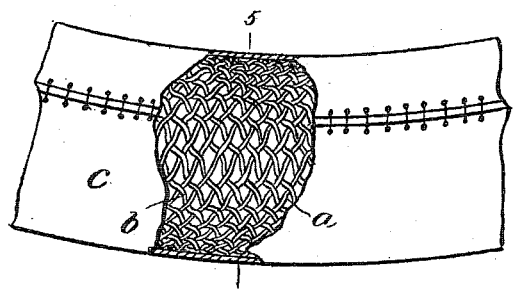
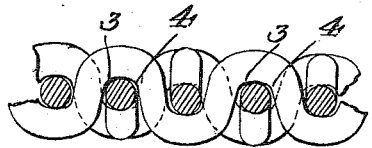
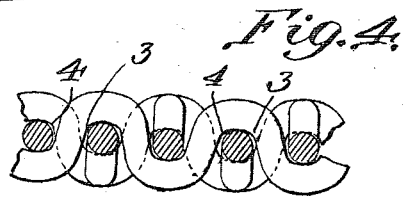
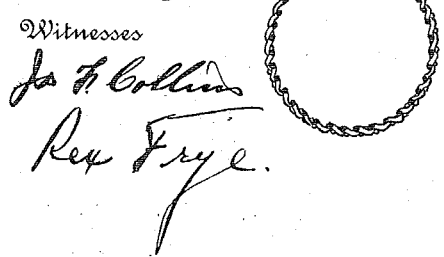
Witnesses
Jo. F. Collins
Rex Frye.
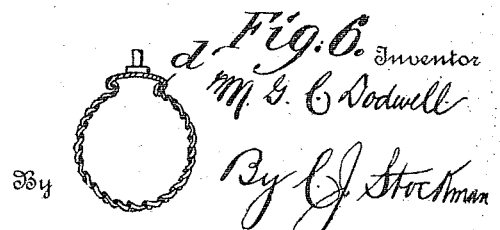
Inventor
M. G. C. Dodwell
By C. J. Stockman
Attorney

UNITED STATES PATENT OFFICE.

MALBY GEORGE CROFTON DODWELL, OF WELLINGTON, NEW ZEALAND.

RESILIENT TIRE.

972,756. Specification of Letters Patent. Patented Oct. 11, 1910.

Application filed January 25, 1910. Serial No. 540,018.

*To all whom it may concern:*

Be it known that I, MALBY GEORGE CROFTON DODWELL, a subject of the King of Great Britain, residing at Wellington, New Zealand, have invented certain new and useful Improvements in Resilient Tires, of which the following is a specification.

This invention relates to improvements in resilient tires and has for its particular purpose the provision of a simple and inexpensive construction of tire which will be durable and possess a high degree of flexibility.

The invention is founded upon the idea of providing a tire formed of intersecting resilient metallic elements, such as spring steel wires, for example, which are free to move angularly to each other within defined limits when subjected to stress or stresses, and in which the stress or stresses will be transmitted over comparatively a wide area and preferably over the whole of the tire, and will immediately return to their previous relative positions when such stress or stresses are removed.

Tires of intersecting strands of wire have been hitherto proposed, but in these the wires at their places of intersection have had no special configuration which adapts them to move angularly relatively to each other under the various stresses to which the tire is subjected when in use and to distribute these stresses throughout the tire: and hence these tires cannot possess the resiliency and durability of the tire forming my present invention. This resiliency and durability can be secured by arranging the wires diagonally and crimping or suitably looping them at their places of intersection, during the process of manufacture of the tire, and preferably while the wires are being woven or platted into tubular or substantially tubular form. The crimping or looping referred to is to be distinguished from the undulating profile which is imparted to wire by weaving the same alternately over and under succeeding intersecting strands, the latter affording no provision for angular relative movement within defined limits, which is essential to the present invention.

In the accompanying drawings I have illustrated my invention with a view of bringing out clearly the particular preferred form of crimp or loop in a manner which will distinguish it from the ordinary uncrimped fabrics or tires.

In the drawings:—Figure 1 is a perspective view of a portion of a tire embodying my present improvement, drawn to an enlarged scale. Fig. 2 is a detail view, on a smaller scale, of a portion of the tire, having a protective covering, a part of which is removed to disclose the tire. Fig. 3 is a section on the line 3—3 of Fig. 1. Fig. 4 is a section on the line 4—4 of Fig. 1. Fig. 5 is a cross-section on the line 5—5 of Fig. 2 and Fig. 6 is a similar view of an alternative form of tire, particularly adapted for clencher rims, this being, however, a less desirable form of the invention than the other.

The tire of the present invention is formed of resilient metallic elements, such as wires $a$ and $b$, preferably made of spring steel of suitable gage, woven, braided or platted diagonally into a mesh of any desired size according to the requirements of the case, and preferably into cylindrical or approximately cylindrical form. The wires where they intersect are crimped sufficiently to provide well defined shoulders 3 and 4 adapted to permit the wires to have relative free angular movement within the limits defined by these shoulders, under the stresses applied thereto when in use. This permits the wires to change their mutual angular positions while it precludes sidewise displacement of the wires and causes the stresses to be transmitted and distributed from one to another positively, instead of by friction merely. It will be understood that the material may be formed into a cylinder of any desired length, and that this cylinder may be cut into sections which are adapted to be bent to conform to the periphery of a wheel. Each tire will preferably be formed in one continuous length extending around the rim of the wheel and secured in any approved manner.

In practice the tire is preferably incased in a covering of canvas or other suitable material to prevent dirt and other matter entering through the mesh. Such a cover is shown at $c$, Fig. 2, as being secured by lacing its edges to the rim $d$ of the wheel.

The construction, operation and advantages of my invention will be apparent from the foregoing description and it will be apparent that the invention may be embodied in other than the illustrated form thereof without departing from its spirit or the scope of the subjoined claims. The particular shapes of the crimps or loops may be employed, provided they are capable of permitting approximately angular relative movement within defined limits and the transmission of stresses positively from one to another.

Having now described my invention what I believe to be new and desire to secure by Letters Patent is:—

1. A resilient tire comprising diagonally arranged intersecting resilient metallic elements free to move angularly relatively to each other when subjected to stress and formed with shoulders which define such movement and allow transmission of the stresses positively from one element to another.

2. A resilient tire comprising intersecting diagonally disposed resilient metallic elements having crimps or loops at their places of intersection adapted to permit relative angular movement within defined limits and transmission of stresses.

3. A resilient tire woven or platted into substantially circular cross sectional area and formed of series of intersecting diagonally arranged strands of wire, crimped at the places of intersection to permit angular relative movement within defined limits and the transmission of stresses positively from one strand to another.

4. A resilient tire comprising a tube of intersecting strands of wire arranged diagonally and crimped at the places of intersection to permit relative angular movement within defined limits and the transmission of stresses positively from one strand to another.

5. A resilient tire comprising a tube of intersecting strands of wire arranged diagonally and crimped at the places of intersection to permit relative angular movement within defined limits and the transmission of stresses positively from one strand to another, and a casing for said cylinder.

In testimony whereof I have hereunto set my hand in the presence of two subscribing witnesses.

MALBY GEORGE CROFTON DODWELL.

Witnesses:
WALTER L. BEAUCHAMP,
CHARLES J. STOCKMAN.